(12) United States Patent
Choi et al.

(10) Patent No.: US 9,840,618 B2
(45) Date of Patent: Dec. 12, 2017

(54) THERMOPLASTIC RESIN COMPOSITION HAVING SUPERIOR CHEMICAL RESISTANCE AND TRANSPARENCY, METHOD OF PREPARING THE SAME AND MOLDED ARTICLE INCLUDING THE SAME

(71) Applicant: LG CHEM, LTD., Seoul (KR)

(72) Inventors: Jeong Su Choi, Daejeon (KR); Ho Hoon Kim, Daejeon (KR); Sang Hoo Park, Daejeon (KR); Keun Hoon Yoo, Daejeon (KR); Roo Da Lee, Daejeon (KR); Won Seok Lee, Daejeon (KR); Seok Goo Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/786,951

(22) PCT Filed: Jun. 8, 2015

(86) PCT No.: PCT/KR2015/005733
§ 371 (c)(1),
(2) Date: Oct. 23, 2015

(87) PCT Pub. No.: WO2016/052832
PCT Pub. Date: Apr. 7, 2016

(65) Prior Publication Data
US 2017/0198132 A1 Jul. 13, 2017

(30) Foreign Application Priority Data

Oct. 2, 2014 (KR) .......................... 10-2014-0132857
Jun. 3, 2015 (KR) .......................... 10-2015-0078514

(51) Int. Cl.
*C08L 51/04* (2006.01)
*C08L 51/00* (2006.01)
*C08L 33/20* (2006.01)

(52) U.S. Cl.
CPC ............... *C08L 51/04* (2013.01); *C08L 33/20* (2013.01); *C08L 51/003* (2013.01); *C08L 2201/08* (2013.01); *C08L 2205/03* (2013.01); *C08L 2205/06* (2013.01)

(58) Field of Classification Search
CPC ................................ C08L 33/20; C08L 51/04
USPC ........................................................ 524/504
See application file for complete search history.

(56) References Cited

U.S. PATENT DOCUMENTS

| 4,767,833 | A | 8/1988 | Yumoto et al. |
| 6,673,873 | B1 | 1/2004 | Zimmerman |
| 2005/0032984 | A1 | 2/2005 | Choi et al. |
| 2010/0222511 | A1 | 9/2010 | Sumimoto |

FOREIGN PATENT DOCUMENTS

| CN | 1578795 A | 9/2005 |
| EP | 1 778 785 | 5/2007 |
| EP | 0 703 525 B2 | 1/2008 |
| JP | 1996-199008 A | 8/1996 |
| JP | 1999-147020 A | 6/1999 |
| KR | 10-2002-0046326 A | 6/2002 |
| KR | 10-2002-0057420 A | 7/2002 |
| KR | 10-2007-0027991 A | 3/2007 |
| KR | 10-0792122 B1 | 1/2008 |

OTHER PUBLICATIONS

KR100376052 machine translation of original document published (2002).*
KR100423873 machine translation of original document published (2002).*
Extended European Search Report for EP Application No. 15784546.2, dated Feb. 27, 2017.
International Search Report for PCT/KR2015/005733 filed on Jun. 8, 2015.
Written Opinion of the International Searching Authority for PCT/KR2015/005733 filed Jun. 8, 2015.
Office Action for Chinese Patent Application No. 201580000726.8 dated May 26, 2017.

* cited by examiner

*Primary Examiner* — Edward Cain

(57) ABSTRACT

Disclosed are a transparent resin composition, which may be used in medical products and food storage containers, having superior chemical resistance and transparency, a method of preparing the same and a molded article manufactured therefrom. More particularly, disclosed are a thermoplastic transparent resin composition having superior chemical resistance and transparency, which comprises (A) a graft copolymer in which a) a conjugated diene rubber latex is graft copolymerized with b) a methacrylate alkyl ester compound or an acrylate alkyl ester compound, c) an aromatic vinyl compound, and d) a vinyl cyano compound; (B) a copolymerized resin in which i) a methacrylate alkyl ester compound or an acrylate alkyl ester compound, ii) an aromatic vinyl compound and iii) a vinyl cyano compound are copolymerized; and (C) a polyether-amide block copolymer, a method of preparing the same, and a molded article manufactured therefrom.

15 Claims, No Drawings

THERMOPLASTIC RESIN COMPOSITION HAVING SUPERIOR CHEMICAL RESISTANCE AND TRANSPARENCY, METHOD OF PREPARING THE SAME AND MOLDED ARTICLE INCLUDING THE SAME

CROSS-REFERENCE TO RELATED APPLICATION

The present application is a National Stage of International Patent Application No. PCT/KR2015/005733 filed on 8 Jun. 2015 which claims the benefit of priority to Korean Patent Application No. 10-2014-0132857 filed on 2 Oct. 2014 and Korean Patent Application No. 10-2015-0078514 filed on 3 Jun. 2015 with the Korean Intellectual Property Office, the disclosure of which is herein incorporated by reference in its entirety.

TECHNICAL FIELD

The present invention relates to a thermoplastic resin composition having superior chemical resistance and transparency, a method of preparing the same and a molded article including the same. More particularly, the present invention relates to a transparent thermoplastic resin composition having superior property balance and excellent chemical resistance and transparency and being applicable to food storage containers and medical products due to the absence of a vinyl cyano compound remainder harmful to the human body, a method of preparing the same, and a molded article including the same.

BACKGROUND ART

Due to environmental issues, many changes in materials industry are required. In particular, conventional materials such as PVC and PC used in medical products or food containers cause endocrine-disrupting chemicals, and disposal thereof is a problem. Thus, attempts to replace conventional materials are actively underway. In particular, in transparent medical materials industry such as syringes and tube connectors in which liquid materials are stored, there is an urgent need for new material development.

As generally used transparent resins, there are a polycarbonate (PC) resin, a polymethylmethacrylate (PMMA) resin, a polystyrene (PS) resin, a polyacrylonitrile-styrene (SAN) resin, etc.

However, since a polycarbonate resin has superior impact strength or transparency, but poor processability, it is difficult to produce precise products and poor chemical resistance is exhibited. In addition, due to bisphenol-A used in preparing polycarbonate, application thereof is increasingly limited.

In addition, a polymethylmethacrylate resin has superior optical properties, but very poor impact resistance and chemical resistance.

Furthermore, a polystyrene (PS) resin and a polyacrylonitrile-styrene (SAN) resin also have poor impact resistance and chemical resistance, and an acrylonitrile remainder is often detected therefrom.

An acrylonitrile-butadiene-styrene-based (hereinafter referred to as ABS) tercopolymer is a resin having well balanced properties such as impact strength and liquidity, but is opaque.

In U.S. Pat. No. 4,767,833, Japanese Patent Application Pub. No. hei 11-147020, European Patent No. 703,252 and Japanese Patent Application No. hei 8-199008, methods of providing transparency by introducing an acrylate alkyl ester or methacrylate alkyl ester compound to an ABS-based resin having superior impact resistance, chemical resistance, processability, etc. are disclosed. However, when the methods are used, poor chemical resistance is exhibited due to methacrylate alkyl ester introduced to provide transparency. Accordingly, chemical resistance required in medical products is deficient, and thus, application thereof to medical products is limited. In addition, to use a resin including acrylonitrile in medical products or food containers, an acrylonitrile remainder should not be detected. However, an acrylonitrile remainder is often detected from transparent ABS-based resin prepared according to the methods, and thus, using the same in medical products is limited.

Accordingly, there is an urgent need for a transparent resin which has superior transparency and, at the same time, superior chemical resistance and from which an acrylonitrile remainder harmful to the human body is not detected, and thus, may be used in medical products or food storage containers.

DISCLOSURE

Technical Problem

Therefore, the present invention has been made in view of the above problems, and it is one object of the present invention to provide a transparent thermoplastic resin composition having superior property balance such as impact resistance and processability and excellent chemical resistance and transparency and being applicable to food storage containers and medical products due to the absence of a vinyl cyano compound remainder harmful to the human body, a method of preparing the same, and a molded article including the same.

The above and other objects can be accomplished by the present invention described below.

Technical Solution

In accordance with one aspect of the present invention, provided is a thermoplastic resin composition comprising 100 parts by weight of a base resin comprising 10 to 90% by weight of a graft copolymer resin and 90 to 10% by weight of a non-graft copolymer resin; and 0.1 to 15 parts by weight of a polyether-amide block copolymer, wherein a weight-average molecular weight of the graft copolymer resin is 80,000 to 300,000 g/mol, a refractive index difference between the graft copolymer resin and the non-graft copolymer resin is 0.01 or less, and, in the base resin, a total content of the conjugated diene rubber is 10 to 40% by weight, a total content of the (meth)acrylate alkyl ester compound is 20 to 65% by weight, a total content of the aromatic vinyl compound is 10 to 35% by weight, and a total content of the vinyl cyano compound is 0 to 5% by weight.

In an embodiment, the base resin may comprise 40 to 70% by weight of the graft copolymer resin and 30 to 60% by weight of the non-graft copolymer resin.

In another embodiment, the base resin may comprise 50 to 60% by weight of the graft copolymer resin and 40 to 50% by weight of the non-graft copolymer resin.

In an embodiment, the graft copolymer resin may be a copolymer resin wherein 20 to 70% by weight of the conjugated diene rubber, 20 to 60% by weight of the (meth)acrylate alkyl ester compound, 7 to 30% by weight of the aromatic vinyl compound and 0 to 10% by weight of the vinyl cyano compound are graft-copolymerized.

In an embodiment, in the graft copolymer resin, the refractive index difference between a rubber and a polymer grafted thereto may be 0.01 or less.

In an embodiment, the weight-average molecular weight of the non-graft copolymer resin may be 80,000 to 300,000 g/mol.

In an embodiment, the non-graft copolymer resin may be a copolymer resin wherein 30 to 75% by weight of the (meth)acrylate alkyl ester compound, 15 to 50% by weight of the aromatic vinyl compound and 0 to 20% by weight of the vinyl cyano compound are polymerized.

In an embodiment, in the polyether-amide block copolymer resin, the refractive index difference between graft copolymer resin and non-graft copolymer resin may be less than 0.01.

In an embodiment, the (meth)acrylate alkyl ester compound may be a methacrylate alkyl ester compound, an acrylate alkyl ester compound or a mixture thereof.

In an embodiment, the aromatic vinyl compound may be one or more selected from the group consisting of styrene, α-methylstyrene, o-ethylstyrene, p-ethylstyrene and vinyltoluene.

In an embodiment, the vinyl cyano compound may be one or more selected from the group consisting of acrylonitrile, methacrylonitrile and ethacrylonitrile.

In an embodiment, the weight-average molecular weight of the thermoplastic resin composition may be 100,000 to 300,000 g/mol.

In an embodiment, in the thermoplastic resin composition, the amount of a remainder of the vinyl cyano compound may be 3 mg/inch$^2$.

In an embodiment, the thermoplastic resin composition may further comprise one or more selected from the group consisting of a thermal stabilizer, a UV stabilizer, a lubricant and an antioxidant.

In accordance with another aspect of the present invention, provided is a method of preparing a thermoplastic resin composition having superior chemical resistance and transparency, the method comprising I) preparing a graft copolymer (A) by forming a graft layer through copolymerizing after mixing a methacrylate alkyl ester compound or an acrylate alkyl ester compound, an aromatic vinyl compound and a vinyl cyano compound along with a conjugated diene-based rubber; II) preparing a copolymerized resin (B) by mass-polymerizing a methacrylate alkyl ester compound or an acrylate alkyl ester compound, an aromatic vinyl compound and a vinyl cyano compound; and III) kneading the graft copolymer (A), the copolymerized resin (B) and a polyether-amide block copolymer (C).

In accordance with yet another aspect of the present invention, provided is a molded article manufactured from the thermoplastic resin composition.

In an embodiment, the molded article may be a product for food, cosmetics or medicine.

Advantageous Effects

As apparent from the fore-going, the present invention advantageously provides a thermoplastic resin composition having superior property balance and excellent chemical resistance and transparency and being applicable to food storage containers and medical products due to the absence of a vinyl cyano compound remainder harmful to the human body, a method of preparing the same, and a molded article including the same.

BEST MODE

A thermoplastic resin composition having superior chemical resistance and transparency according to the present invention comprises (A) a graft copolymer in which a) a conjugated diene rubber latex is graft copolymerized with b) a methacrylate alkyl ester compound or an acrylate alkyl ester compound, c) an aromatic vinyl compound, and d) a vinyl cyano compound; (B) a copolymerized resin in which i) a methacrylate alkyl ester compound or an acrylate alkyl ester compound, ii) an aromatic vinyl compound and iii) a vinyl cyano compound are copolymerized; and (C) a polyether-amide block copolymer.

In an embodiment, the thermoplastic resin composition may comprise (A) 10 to 90 parts by weight of a graft copolymer in which a) a conjugated diene rubber latex is graft-copolymerized with b) a methacrylate alkyl ester compound or an acrylate alkyl ester compound, c) an aromatic vinyl compound and d) a vinyl cyano compound; (B) 10 to 90 parts by weight of a copolymerized resin in which i) a methacrylate alkyl ester compound or an acrylate alkyl ester compound, ii) an aromatic vinyl compound and iii) a vinyl cyano compound are copolymerized; and (C) 0.1 to 15 parts by weight of a polyether-amide block copolymer. Here, the total amount of a mixture of (A) and (B) as a base resin may be 100 parts by weight.

In an embodiment, the base resin including (A) and (B) may comprise a) 10 to 40% by weight of a conjugated diene rubber latex (based on a solid content); 20 to 65% by weight of a methacrylate alkyl ester compound or an acrylate alkyl ester compound; 10 to 35% by weight of an aromatic vinyl compound; and 0 to 5% by weight of a vinyl cyano compound.

In addition, a method of preparing the thermoplastic resin composition having superior chemical resistance and transparency according to the present invention comprises I) preparing a graft copolymer (A) by forming a graft layer through copolymerizing after mixing a methacrylate alkyl ester compound or an acrylate alkyl ester compound, an aromatic vinyl compound and a vinyl cyano compound along with a conjugated diene-based rubber; II) preparing a copolymerized resin (B) by mass-polymerizing a methacrylate alkyl ester compound or an acrylate alkyl ester compound, an aromatic vinyl compound and a vinyl cyano compound; and III) kneading the graft copolymer (A), the copolymerized resin (B) and a polyether-amide block copolymer (C).

In an embodiment, (A), (B) and (C) may be premixed before III) the kneading.

In the present disclosure, the expression "mixing" may mean that particles are mixed while maintaining shapes thereof, and the expression "kneading" may mean that particles are destroyed or deformed and uniformly mixed.

Hereinafter, the present invention is described in detail.

(A) Graft Copolymer (Resin)

The graft copolymer is prepared by graft-copolymerizing a methacrylate alkyl ester compound or an acrylate alkyl ester compound, an aromatic vinyl compound and a vinyl cyano compound with a conjugated diene rubber latex. In an embodiment, a) 20 to 70 parts by weight of the conjugated diene rubber latex (based on a solid content) is graft copolymerized with b) 20 to 60 parts by weight of the methacrylate alkyl ester compound or the acrylate alkyl ester compound, c) 7 to 30 parts by weight of the aromatic vinyl compound and d) 0 to 10 parts by weight of the vinyl cyano compound based on 100 parts by weight of the graft copolymer.

In the present disclosure, the methacrylate alkyl ester compound and the acrylate alkyl ester compound are collectively referred to as a (meth)acrylate alkyl ester compound.

The conjugated diene rubber is a conjugated compound polymer wherein a double bond and a single bond are alternately arranged. Examples of a conjugated diene rubber which may be used in the present invention include a butadiene polymer, a butadiene-styrene copolymer (SBR), a butadiene-acrylonitrile copolymer (NBR), ethylene-propylene copolymer (EPDM) and polymers derived therefrom. In particular, among the conjugated diene rubbers, the butadiene polymer or the butadiene-styrene copolymer is preferable.

When effects of the present invention are considered, the average particle diameter of the conjugated diene rubber latex is preferably 800 to 4,000 Å. In addition, the conjugated diene rubber latex preferably includes 60 to 95% by weight of a gel and has a swell index of preferably 12 to 40.

In addition, the conjugated diene rubber latex is included in an amount of 20 to 70 parts by weight (based on solid content). When the content of the conjugated diene rubber latex is less than 20 parts by weight, chemical resistance is decreased. When the content of the conjugated diene rubber latex is greater than 70 parts by weight, complete grafting is not performed during polymerization and thus mechanical properties are deteriorated.

In an embodiment, as the (meth)acrylate alkyl ester compound, (meth)acrylate methyl ester, (meth)acrylate ethyl ester, (meth)acrylate propyl ester, (meth)acrylate 2-ethylhexyl ester, (meth)acrylate decyl ester, (meth)acrylate lauryl ester, or the like may be used. Preferably, methylmethacrylate is used. In addition, the (meth)acrylate alkyl ester compound is preferably included in an amount of 20 to 60 parts by weight.

In an embodiment, the aromatic vinyl compound may be styrene, α-methylstyrene, p-methylstyrene, vinyltoluene, or the like. Preferably, styrene is used. In a preferred embodiment, the aromatic vinyl compound is included in an amount of 7 to 30 parts by weight.

In an embodiment, as the vinyl cyano compound, acrylonitrile or methacrylonitrile may be used. The vinyl cyano compound may be used in an amount of 0 to 10 parts by weight, 0.1 to 10 parts by weight, or 1 to 5 parts by weight. Here, as the content of the vinyl cyano compound is increased or decreased, the content of the rubber, the (meth)acrylate alkyl ester compound or the aromatic vinyl compound may be decreased or increased. When the content of the vinyl cyano compound is greater than 10 parts by weight, the resin becomes yellow, thus not satisfying consumer demand for natural color. In addition, a large amount of solid (coagulum) is generated during graft polymerization, and thus, mass production thereof is difficult. Furthermore, an acrylonitrile remainder is detected and thus application thereof to medical products or food storage containers is not proper.

Transparency of (A) the graft copolymer according to the present invention is determined by the refractive index of a rubber and the refractive index of a grafted polymer, and the refractive index of the polymer is controlled by a mix ratio of monomers. That is, since the refractive indexes of the conjugated diene rubber latex and the refractive index of other ingredients should be similarly adjusted, a mix ratio of monomers is very important. That is, in order to provide transparency, the refractive index of the conjugated diene compound used as a core for grafting should be similar to refractive indexes of all grafted ingredients. Most preferably, the refractive index of the conjugated diene compound is the same as the refractive indexes of all of the grafted ingredients. In a preferred embodiment, difference between the refractive index of the conjugated diene rubber latex and the refractive indexes of all of the grafted compounds is less than 0.01. The refractive indexes of monomers used in the thermoplastic transparent resin of the present invention are as follows: butadiene: 1.518, methylmethacrylate: 1.49, styrene: 1.59, acrylonitrile: 1.52, acrylate: 1.527, and polyethyleneglycol monomethacrylate: 1.49 to 1.52.

In addition, the refractive indexes of mixtures or copolymers of compounds graft-polymerized with the conjugated diene rubber resin of the thermoplastic transparent resin may be calculated as follows:

RI=ΣWti*RIi

Wti=% by weight of each ingredient in copolymer
RIi=Refractive index of polymer of each ingredient in copolymer A graft copolymerization method used in the present invention is not specifically limited and, in an embodiment, an emulsion polymerization method may be used. Each ingredient may be input batchwise, or a total or a portion thereof may be continuously input, but the present invention is not limited thereto.

During graft polymerization, a molecular weight regulator along with the monomers may be input to control molecular weight. In an embodiment, as the molecular weight regulator, dodecylmercaptan such as t-dodecyl mercaptan, n-dodecyl mercaptan, etc. may be used.

In an embodiment, the weight-average molecular weight of the graft polymer after the graft polymerization is 80,000 to 300,000 g/mol, 100,000 to 200,000 g/mol, or 130,000 to 170,000 g/mol. When the weight-average molecular weight is less than 80,000 g/mol, impact strength and chemical resistance of final products are relatively decreased. When the weight-average molecular weight is greater than 300,000 g/mol, liquidity is decreased and thus processability is deteriorated.

(B) Copolymerized Resin (Non-Graft Copolymer Resin)

In an embodiment, (B) the copolymerized resin is a copolymer comprising 30 to 75 parts by weight of a (meth) acrylate alkyl ester compound, 15 to 50 parts by weight of an aromatic vinyl compound and 0 to 20 parts by weight of a vinyl cyano compound. The refractive index thereof is similar to that of (A) the graft copolymer.

In another embodiment, (B) the copolymerized resin may be a copolymer comprising 40 to 75 parts by weight of the (meth)acrylate alkyl ester compound, 15 to 40 parts by weight of the aromatic vinyl compound and 0 to 20 parts by weight of the vinyl cyano compound.

A method of preparing the copolymerized resin (II) according to the present invention is not specifically limited and suspension polymerization or mass polymerization may be used. In particular, continuous mass polymerization is most suitable when preparation costs are considered. The vinyl cyano compound is used in an amount of 0 to 20 parts by weight, 0.1 to 20 parts by weight, 1 to 15 parts by weight, or 1 to 10 parts by weight. Here, as the content of the vinyl cyano compound is increased or decreased, the content of the (meth)acrylate alkyl ester compound or aromatic vinyl compound may be decreased or increased. When the vinyl cyano compound is used in an amount of greater than 20 parts by weight, color is changed to yellow, and an acrylonitrile remainder is detected in final products.

In an embodiment, as the aromatic vinyl compound, styrene, α-methylstyrene, p-methylstyrene, vinyltoluene, or the like may be used. Preferably, styrene is used. In a preferred embodiment, acrylonitrile or methacrylonitrile is used as the vinyl cyano compound. In addition, examples of the (meth)acrylate alkyl ester compound include (meth)

acrylate methyl ester, (meth)acrylate ethyl ester, (meth)acrylate propyl ester, (meth)acrylate 2-ethylhexyl ester, (meth)acrylate decyl ester, (meth)acrylate lauryl ester, etc. Thereamong, (meth)acrylate methyl ester is preferable and methyl methacrylate is most preferable.

A mix ratio of the monomers is very important to obtain a resin having transparency, and a refractive index depends upon a mix ratio. That is, the refractive index of (B) the copolymer resin should be similar to that of (A) the graft copolymer. More preferably, the refractive index of (B) the copolymer resin is the same as that of (A) the graft copolymer. When difference between the refractive index of (A) and the refractive index of (B) is greater than 0.01, transparency of a resin composition is decreased, thus being unsuitable for the present invention.

The refractive index (refractive index of a polymer after polymerization) of each of the ingredients is as follows: butadiene: 1.518, methyl methacrylate: 1.49, styrene: 1.592 and acrylonitrile: 1.52. The refractive index of a grafted polymer may be as follows:

$$RI = \Sigma Wti * RIi$$

Wti=% by weight of each ingredient in copolymer
RIi=Refractive index of polymer of each ingredient in copolymer The weight-average molecular weight of (B) the copolymer resin may be controlled to 80,000 to 300,000 g/mol, 100,000 to 200,000 g/mol, or 110,000 to 150,000 g/mol using a molecular weight regulator. When the weight-average molecular weight is less than 80,000 g/mol, impact strength and chemical resistance of final products are relatively decreased. When the weight-average molecular weight is greater than 300,000 g/mol, liquidity is decreased and processability is deteriorated. In an embodiment, as the molecular weight regulator, dodecyl mercaptan such as t-dodecyl mercaptan or n-dodecyl mercaptan may be used.

(C) Polyether-Amide Block Copolymer

In an embodiment, the polyether-amide block copolymer may be polyether ester amide.

In an embodiment, the polyether ester amide may be composed of two ingredients, i.e., a polyamide oligomer including a carboxyl group at a terminal thereof and having a number average molecular weight of 100 to 6,000 g/mol, 200 to 5,000 g/mol, or 1,000 to 4,000 g/mol, and bisphenol compound including a oxyalkylene unit and having a number average molecular weight of 200 to 4,000 g/mol, 300 to 3,000 g/mol, or 500 to 2,500 g/mol.

The polyamide oligomer and the bisphenol compound are not specifically limited so long as generally used in the art.

In a preferred embodiment, the polyether ester amide may be Pelestat NC 6321 or Pelestat NC 6500.

Kneading of (A), (B) and (C)

In a specific embodiment, a thermoplastic transparent resin composition may be prepared by kneading, or mixing and kneading the (A) graft copolymer, (B) the copolymerized resin and (C) the polyether-amide block copolymer. In an embodiment, the base resin including (A) and (B) may include a) 10 to 40% by weight of a conjugated diene rubber latex, b) 20 to 65% by weight of a (meth)acrylate alkyl ester compound, c) 10 to 35% by weight of an aromatic vinyl compound, and d) 0 to 5% by weight of a vinyl cyano compound based on 100% by weight of the base resin including (A) and (B). When the content of a) the conjugated diene rubber is less than 10% by weight, impact strength is decreased and chemical resistance is poor, which is not suitable for the present invention. When the content of the rubber is greater than 40% by weight, processability is decreased and a flow mark on a surface is generated, thereby decreasing transparency. In addition, within the content ranges of b) the (meth)acrylate alkyl ester compound and c) the aromatic vinyl compound, the amount of a used rubber latex and a refractive index are similar, and thus, superior transparency is exhibited. In addition, within the content range of d) the vinyl cyano compound, a vinyl cyano compound is not detected in a remainder detection test, thus being suitable for the objection of the present invention.

In an embodiment, the content of a) the conjugated diene rubber latex may be greater than 10% by weight and 40% by weight or less, or 11 to 40% by weight. In this case, superior processability and transparency are exhibited.

In an embodiment, the content of d) the vinyl cyano compound may be 0.1 to 5% by weight, 0.1 to 4.9% by weight, or 3 to 4.5% by weight. Within this range, superior property balance is exhibited and a vinyl cyano compound is not detected in a remainder detection test, thus being suitable for the objection of the present invention.

The weight-average molecular weight of a kneaded final product is 100,000 to 300,000 g/mol, 110,000 to 200,000 g/mol, or 120,000 to 150,000 g/mol. When the weight-average molecular weight is less than 100,000 g/mol, a final product has decreased chemical resistance. When the weight-average molecular weight is greater than 300,000 g/mol, liquidity is decreased and thus processability is deteriorated.

When (C) 0.1 to 30 parts by weight of the polyether-amide copolymer [based on 100 parts by weight of a mixture of (A) and (B)] is added to the (A) graft copolymer and (B) the copolymerized resin and kneading is performed, chemical resistance is enhanced. When the amount of the polyether-amide copolymer is less than 0.1 parts by weight, there is little enhancement in chemical resistance. When the amount of the polyether-amide copolymer is greater than 30 parts by weight, mechanical strength and transparency are decreased and economic efficiency is decreased due to high material costs. Since the refractive index of a used polyether-amide copolymer (C) affects transparency of a final product, difference between the refractive index of the graft copolymer (A) and the refractive index of the copolymerized resin (B) is preferably 0.01 or less. When the refractive index difference is greater than 0.01, transparency is decreased.

In an embodiment, (C) the polyether-amide block copolymer may be added and kneaded after kneading (A) the graft copolymer and (B) the copolymerized resin. In another embodiment, (A) the graft copolymer, (B) the copolymerized resin and (C) the polyether-amide block copolymer may be simultaneously kneaded.

The transparent thermoplastic resin composition according to the present invention may further comprise a thermal stabilizer, a UV stabilizer, a lubricant, etc. so long as properties thereof are not affected. The composition is evenly dispersed using a single-screw extruder, a twin-screw extruder, a Banbury mixer, etc. Subsequently, the dispersed composition is passed through a water bath and cut, thereby preparing a pelletized transparent resin composition.

A molded article according to the present invention is manufactured from the transparent thermoplastic resin composition.

In an embodiment, the molded article may be a product for food, cosmetics or medicine. In this case, contents may be easily confirmed and, in particular, a vinyl cyano compound remainder is not present, thereby being safe and harmless to the human body.

The product for food, cosmetics or medicine may be respectively a food storage container, a cosmetics storage container or a medicine storage container. In this case, a state or the amount of food, cosmetics and medicine may be easily confirmed, and a vinyl cyano compound remainder is not present, thereby being harmless to the human body.

Although the preferred embodiments of the present invention are disclosed for illustrative purposes, those skilled in the art will appreciate that various modifications, additions and substitutions are possible, without departing from the scope and spirit of the invention as disclosed in the accompanying claims.

EXAMPLE

Preparation Example A-1: Graft Copolymer Preparation-1

In order to prepare a graft copolymer, 100 parts by weight of ion exchanged water, 1.0 parts by weight of sodium oleate as an emulsifier, 35 parts by weight of methylmethacrylate, 12 parts by weight of styrene, 3 parts by weight of acrylonitrile, 0.3 parts by weight of tertiary dodecyl mercaptan, 0.05 parts by weight of ethylene diamine tetraacetic acid, 0.1 parts by weight of sodium formaldehyde sulfoxylate, 0.001 parts by weight of ferrous sulfate, and 0.2 parts by weight of t-butylhydroperoxide were continuously added to 50 parts by weight (based on a solid content) of a polybutadiene rubber latex including 70% by weight of a gel and having an average particle diameter of 0.3 μm prepared through emulsion polymerization, and reaction was performed at 75° C. for five hours. Subsequently, temperature was elevated to 80° C. and then aging was performed for one hour, followed by terminating reaction. A generated latex was solidified using an aqueous calcium chloride solution and cleaned, followed by obtaining a graft copolymer powder. The refractive index of the obtained graft copolymer was 1.516 and the weight-average molecular weight thereof was 150,000 g/mol.

Preparation Example A-2: Graft Copolymer Preparation-2

A graft copolymer was prepared in the same manner as in Preparation Example A-1, except that 18 parts by weight, instead of 50 parts by weight, of the rubber latex, 58.5 parts by weight, instead of 35 parts by weight, of methylmethacrylate, and 20.5 parts by weight, instead of 12 parts by weight, of styrene were used. An obtained graft copolymer has a refractive index of 1.516 and a weight-average molecular weight of 170,000 g/mol.

Preparation Example A-3: Graft Copolymer Preparation-3

A graft copolymer was prepared in the same manner as in Preparation Example A-1, except that, 29.8 parts by weight, instead of 35 parts by weight, of methylmethacrylate, and 19.2 parts by weight, instead of 12 parts by weight, of styrene were used. An obtained graft copolymer had a refractive index of 1.53 and a weight-average molecular weight of 150,000 g/mol.

Preparation Example A-4: Graft Copolymer Preparation-4

A graft copolymer was prepared in the same manner as in Preparation Example A-1, except that, 0.8 parts by weight, instead of 0.3 parts by weight, of tertiary dodecyl mercaptan was used. An obtained graft copolymer had a refractive index of 1.516 and a weight-average molecular weight of 70,000 g/mol.

Preparation Example A-5: Graft Copolymer Preparation-5

A graft copolymer was prepared in the same manner as in Preparation Example A-1, except that, 32 parts by weight, instead of 35 parts by weight, of methylmethacrylate, 11 parts by weight, instead of 12 parts by weight, of styrene, and 7 parts by weight, instead of 3 parts by weight, of acrylonitrile were used. An obtained graft copolymer had a refractive index of 1.516 and a weight-average molecular weight of 150,000 g/mol.

Preparation Example A-6: Graft Copolymer Preparation-5

A graft copolymer was prepared in the same manner as in Example A-1, except that tertiary dodecyl mercaptan was used. An obtained graft copolymer had a refractive index of 1.517 and a weight-average molecular weight of 350,000 g/mol.

Preparation Example B-1: Manufacture of Copolymerized Resin-1

30 parts by weight of toluene as a solvent and 0.15 parts by weight of di-t-dodecyl mercaptan as a molecular weight regulator were mixed with 70.4 parts by weight of methylmethacrylate, 24.6 parts by weight of styrene and 5 parts by weight of acrylonitrile. A resultant mixture was continuously input to a reaction bath over three hours. Subsequently, reaction temperature was maintained at 148° C. A polymerized solution released from the reaction bath was heated in a pre-heating bath and an unreacted monomer was volatilized in a volatilization bath. Temperature of a polymer was maintained at 210° C. and a copolymer resin was pelletized using a polymer transfer pump extruder. A resultant copolymerized resin had a weight-average molecular weight of 120,000 g/mol, and a final refractive index of an obtained pellet was 1.516.

Preparation Example B-2: Manufacture of Copolymerized Resin-2

A copolymerized resin was prepared in the same manner as in Preparation Example B-1, except that 40 parts by weight of methylmethacrylate and 50 parts by weight of styrene were used instead of 70.4 parts by weight of methylmethacrylate and 24.6 parts by weight of styrene. A prepared copolymerized resin had a weight-average molecular weight of 120,000 g/mol, and a final refractive index of an obtained pellet was 1.542.

Preparation Example B-3: Manufacture of Copolymerized Resin-3

A copolymerized resin was prepared in the same manner as in Preparation Example B-1, except that tertiary dodecyl mercaptan was used in an amount of 0.5 parts by weight, instead of 0.15 parts by weight. A prepared copolymerized resin had a weight-average molecular weight of 60,000 g/mol, and a final refractive index of an obtained pellet was 1.516.

Preparation Example B-4: Manufacture of Copolymerized Resin-4

A copolymerized resin was prepared in the same manner as in Preparation Example B-1, except that 63.2 parts by weight of methylmethacrylate, 21.8 parts by weight of styrene and 15 parts by weight of acrylonitrile were used instead of 70.4 parts by weight of methylmethacrylate, 24.6 parts by weight of styrene and 5 parts by weight of acrylonitrile. A prepared copolymerized resin had a weight-average molecular weight of 120,000 g/mol, and a final refractive index of an obtained pellet was 1.516.

Preparation Example C-1: Polyether-Amide Block Copolymer-1

As a polyether-amide copolymer, Pelestat NC 6321 having a refractive index of 1.516 available from SANYO Chemical was used.

Preparation Example C-2: Polyether-Amide Block Copolymer-2

As a polyether-amide copolymer, Pelestat NC 6500 having a refractive index of 1.513 available from SANYO Chemical was used.

Examples 1 to 3 and Comparative Examples 1 to 6

Each of a graft copolymer (A), a copolymerized resin (B) and a polyether-amide block copolymer (C) prepared according to Preparation Examples A-1 to B-3 was mixed as summarized in Table 1 below, and 0.3 parts by weight of a lubricant and 0.2 parts by weight of an antioxidant were added thereto, followed by pelletizing at a cylinder temperature of 220° C. using a twin-screw extrusion kneader. A prepared pellet was injected to manufacture a specimen. Properties of a resultant specimen were measured according to the following methods. Results are summarized in Table 2 below.

Gel content (%) and swell index: A rubber latex was solidified using a dilute acid or a metal salt and then cleaned, followed by drying in a 60° C. vacuum oven. A lump of an obtained rubber was cut with a scissors and then a 1 g rubber fragment was input to 100 g of toluene, followed by storing in a dark room for 48 hours. Subsequently, a resultant product was separated into sol and gel. A gel content and a swell index were measured according to Equations 2 and 3 below.

Gel content (%)=(Weight of insoluble material (gel)/Weight of sample)*100     [Equation 1]

Swell index=Weight of swelled gel/Weight of gel     [Equation 2]

Refractive index: A specimen was thinly spread to a thickness of about 0.2 mm and then the refractive index thereof was measured with an Abbe refractometer at 25° C.

Weight-average molecular weight: Was measured using GPC. Here, after calibrating using a PMMA standard, the molecular weights of a graft copolymer (A) and a copolymerized resin (B) were measured.

Transparency (Haze Value): Was measured according to ASTM1003.

Chemical resistance: A tensile specimen was fixed to a 1.2% jig and then was coated with a 70% IPA solution. After one hour, variations were observed.

Acrylonitrile remainder evaluation: An acrylonitrile remainder was analyzed according to US FDA 21 CFR 181.32. For an elution test of an acrylonitrile remainder, a specimen was stored in 120° F. distilled water for 24 hours, in a 120° F. 3% acetic acid solution for 24 hours, in a 120° F. 8% alcoholic solution for 24 hours, and in n-Heptane at 70° F. for 30 min. When the acrylonitrile remainder content is 3 mg/inch$^2$ or less, the specimen passed inspection.

Impact resistance: Notched Izod impact strength was measured using a ⅛ inch specimen according to ASTM256.

Processability (MI): Was measured according to ASTM1238 under conditions of 220° C. and 10 kg.

TABLE 1

Compositions of Examples 1 to 3 and Comparative Examples 1 to 8

| Classification | Graft copolymer (A) | | | | | | Copolymerized resin (B) | | | | Polyether-amide copolymer (C) | |
|---|---|---|---|---|---|---|---|---|---|---|---|---|
| | A-1 | A-2 | A-3 | A-4 | A-5 | A-6 | B-1 | B-2 | B-3 | B-4 | C-1 | C-2 |
| Example 1 | 60 | | | | | | 40 | | | | 4 | — |
| Example 2 | 50 | | | | | | 50 | | | | 6 | — |
| Example 3 | 55 | | | | | | 45 | | | | — | 5 |
| Comparative Example 1 | | 30 | | | | | 70 | | | | 5 | — |
| Comparative Example 2 | | | 50 | | | | 50 | | | | 5 | — |
| Comparative Example 3 | 50 | | | | | | | 50 | | | 5 | — |
| Comparative Example 4 | | | | 50 | | | | | 50 | | 5 | — |
| Comparative Example 5 | | | | | 50 | | | | | 50 | 5 | — |
| Comparative Example 6 | 50 | | | | | | | 50 | | | 0 | — |
| Comparative Example 7 | | | | | | 60 | 40 | | | | 4 | — |
| Comparative Example 8 | 100 | | | | | | | | | | 4 | — |

TABLE 2

Properties of Examples 1 to 3 and Comparative Examples 1 to 8

| Classification | Molecular weight | Impact strength | Processability | Transparency | Chemical resistance | Acrylonitrile remainder |
|---|---|---|---|---|---|---|
| Example 1 | 135,000 | 25 | 3 | 2.5 | No Change Pass | Pass |
| Example 2 | 130,000 | 21 | 4 | 2.4 | No Change Pass | Pass |
| Example 3 | 133,000 | 23 | 3 | 2.5 | No Change Pass | Pass |
| Comparative Example 1 | 150,000 | 7 | 5 | 2.0 | Break | Pass |
| Comparative Example 2 | 130,000 | 22 | 3 | 45 | No Change Pass | Pass |
| Comparative Example 3 | 130,000 | 20 | 3 | >50 | No Change Pass | Pass |
| Comparative Example 4 | 65,000 | 15 | 11 | 2.0 | Break | Pass |
| Comparative Example 5 | 130,000 | 25 | 3 | 2.4 | No Change Pass | Fail |
| Comparative Example 6 | 135,000 | 20 | 3 | 2.2 | Crack | Pass |
| Comparative Example 7 | | N/A | N/A | N/A | N/A | N/A |
| Comparative Example 8 | 150,000 | N/A | N/A | N/A | N/A | N/A |

As shown in Table 1, in Examples 1, 2 and 3, superior transparency and chemical resistance are exhibited and an acrylonitrile remainder is not detected. Accordingly, these correspond to the intention of the present invention.

However, in the case of Comparative Example 1, the rubber content in the graft copolymer is low, and the rubber content in the base resin including A and B is 5.4% by weight. Such contents are outside the range of the present invention, and thus, poor chemical resistance is exhibited.

In addition, in the cases of Comparative Examples 2 and 3, the refractive index of the rubber differs from that of the grafted polymer, or the refractive index of the graft copolymer (A) differs from that of the copolymerized resin (B). Accordingly, haze rapidly increased and transparency is decreased.

In addition, in the acrylonitrile remainder evaluation and the transparency evaluation of Comparative Example 4, superior properties are exhibited, but low molecular weight and decreased chemical resistance are exhibited. Furthermore, in Comparative Example 4, the molecular weight of each of the graft copolymer (A) and the MSAN copolymer (B) upon preparation of the graft copolymer (A) and the MSAN copolymer (B) is about 60,000 g/mol, and the molecular weight of a final product is less than 100,000 g/mol. Accordingly, in the case of Comparative Example 4, impact strength is rapidly decreased.

In addition, in the case of Comparative Example 5, the acrylonitrile content in the constituent is high and an acrylonitrile remainder is detected from a final product. Accordingly, it is not suitable for using a copolymer prepared according to Comparative Example 5 in a product for food, cosmetics or medicine, and thus, the copolymer is not suitable for the present invention.

In addition, it can be confirmed that, in the case of Comparative Example 6, the polyether-amide copolymer (C) is not used, and thus, chemical resistance is poor. Accordingly, a copolymer prepared according to Comparative Example 6 is not suitable for the present invention.

Furthermore, in the case of Comparative Example 7 in which the graft resin (A) having a weight-average molecular weight of greater than 300,000 g/mol is included, internal resistance of an extruder is high during extrusion, and thus, it is difficult to conduct extrusion. In addition, a large amount of unmolded products are generated during injection, whereby it is impossible to perform property evaluation.

Finally, in the case of Comparative Example 8 in which the copolymerized resin (B) is not included, carbonization too often occurs, and large amounts of non-molded products and flow marks are generated during injection, whereby it is impossible to perform property evaluation.

What is claimed is:

1. A thermoplastic resin composition comprising:
   100 parts by weight of a base resin comprising 10 to 90% by weight of a graft copolymer resin and 90 to 10% by weight of a non-graft copolymer resin; and
   0.1 to 15 parts by weight of a polyether-amide block copolymer,
   wherein a weight-average molecular weight of the graft copolymer resin is 80,000 to 300,000 g/mol,
   a refractive index difference between the graft copolymer resin and the non-graft copolymer resin is 0.01 or less, and
   in the base resin, a total content of a conjugated diene rubber is 10 to 40% by weight, a total content of a (meth)acrylate alkyl ester compound is 20 to 65% by weight, a total content of an aromatic vinyl compound is 10 to 35% by weight, and a total content of a vinyl cyano compound is 0 to 5% by weight.

2. The thermoplastic resin composition according to claim 1, wherein the graft copolymer resin is a copolymer resin wherein 20 to 70% by weight of the conjugated diene rubber, 20 to 60% by weight of the (meth)acrylate alkyl ester compound, 7 to 30% by weight of the aromatic vinyl compound and 0 to 10% by weight of the vinyl cyano compound are graft-copolymerized.

3. The thermoplastic resin composition according to claim 1, wherein, in the graft copolymer resin, a refractive index difference between a rubber and a polymer grafted thereto is 0.01 or less.

4. The thermoplastic resin composition according to claim 1, wherein a weight-average molecular weight of the non-graft copolymer resin is 80,000 to 300,000 g/mol.

5. The thermoplastic resin composition according to claim 1, wherein the non-graft copolymer resin is a copolymer resin wherein 30 to 75% by weight of the (meth)acrylate alkyl ester compound, 15 to 50% by weight of the aromatic vinyl compound and 0 to 20% by weight of the vinyl cyano compound are polymerized.

6. The thermoplastic resin composition according to claim 1, wherein a difference between a refractive index of the graft copolymer resin and a refractive index of the non-graft copolymer resin is less than 0.01.

7. The thermoplastic resin composition according to claim 1, wherein the (meth)acrylate alkyl ester compound is a methacrylate alkyl ester compound, an acrylate alkyl ester compound or a mixture thereof.

8. The thermoplastic resin composition according to claim 1, wherein the aromatic vinyl compound is one or more selected from the group consisting of styrene, α-methylstyrene, o-ethyl styrene, p-ethylstyrene and vinyltoluene.

9. The thermoplastic resin composition according to claim 1, wherein the vinyl cyano compound is one or more selected from the group consisting of acrylonitrile, methacrylonitrile and ethacrylonitrile.

10. The thermoplastic resin composition according to claim 1, wherein a weight-average molecular weight of the thermoplastic resin composition is 100,000 to 300,000 g/mol.

11. The thermoplastic resin composition according to claim 1, wherein, in the thermoplastic resin composition, an amount of a remainder of the vinyl cyano compound is 0.003 mg/inch$^2$.

12. The thermoplastic resin composition according to claim 1, wherein the thermoplastic resin composition further comprises one or more selected from the group consisting of a thermal stabilizer, a UV stabilizer, a lubricant and an antioxidant.

13. A method of preparing a thermoplastic resin composition, the method comprising:
    preparing a graft copolymer (A) by forming a graft layer through copolymerizing after mixing a (meth)acrylate alkyl ester compound, an aromatic vinyl compound and a vinyl cyano compound along with a conjugated diene-based rubber;
    preparing a copolymerized resin (B) by mass-polymerizing a (meth)acrylate alkyl ester compound, an aromatic vinyl compound and a vinyl cyano compound; and
    kneading the graft copolymer (A), the copolymerized resin (B) and a polyether-amide block copolymer (C).

14. A molded article manufactured from the thermoplastic resin composition according to claim 1.

15. The molded article according to claim 14, wherein the molded article is a product for food, cosmetics or medicine.

* * * * *